(12) United States Patent
Burns et al.

(10) Patent No.: US 12,405,786 B1
(45) Date of Patent: Sep. 2, 2025

(54) HARDWARE SUPPORT FOR CONVERSION BETWEEN INTEGER AND FLOATING-POINT DATA

(71) Applicant: Apple Inc., Cupertino, CA (US)

(72) Inventors: Christopher A. Burns, Austin, TX (US); Terence M. Potter, Austin, TX (US); Yoong Chert Foo, London (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/588,724

(22) Filed: Feb. 27, 2024

(51) Int. Cl.
   *G06F 9/30* (2018.01)
   *G06F 9/38* (2018.01)

(52) U.S. Cl.
   CPC .................. *G06F 9/30014* (2013.01)

(58) Field of Classification Search
   CPC ............. G06F 9/30014; G06F 9/30025; G06F 9/3893; G06F 17/15; G06F 17/16
   See application file for complete search history.

(56) References Cited

U.S. PATENT DOCUMENTS

| | | | | |
|---|---|---|---|---|
| 6,591,361 | B1* | 7/2003 | Liao .................. | G06F 9/3001 708/517 |
| 10,853,067 | B2 | 12/2020 | Henry et al. | |
| 2004/0128331 | A1* | 7/2004 | Hinds ............... | G06F 9/30014 708/204 |
| 2009/0172349 | A1* | 7/2009 | Sprangle ........... | G06F 9/30043 712/E9.021 |
| 2020/0167632 | A1* | 5/2020 | Kim ................... | G06F 7/483 |
| 2021/0224033 | A1* | 7/2021 | Li ...................... | G06N 3/045 |
| 2021/0311703 | A1* | 10/2021 | Kim ................... | G06F 7/4876 |
| 2022/0066737 | A1 | 3/2022 | Mu et al. | |
| 2022/0067530 | A1* | 3/2022 | Khailany ........... | G06F 7/5443 |
| 2022/0137963 | A1* | 5/2022 | Yang .................. | H03M 7/70 712/225 |
| 2023/0376272 | A1 | 11/2023 | Van Baalen et al. | |
| 2024/0211763 | A1* | 6/2024 | Trusov .............. | G06N 3/048 |

OTHER PUBLICATIONS

S. Kim, et al., "Performance Evaluation of INT8 Quantized Inference on Mobile GPUs," Dec. 6, 2021, pp. 164245-164255, vol. 9, IEEE Access.

Pengchao Hu et al, "TPU-MLIR: A Compiler For TPU Using MLIR," Feb. 9, 2023, pp. 1-11, Sophgo Inc.

* cited by examiner

*Primary Examiner* — Jacob Petranek
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to conversion operations in the context of integer and floating-point processor operations. In some embodiments, floating-point pipeline circuitry is configured to execute a single instruction to convert an N-bit integer value to an M-bit floating-point result. To execute the instruction, source modifier circuitry may generate an intermediate M-bit representation based on the N-bit integer value. Fused multiply-add circuitry may perform a fused multiply-add operation to generate the M-bit floating-point result, where the fused multiply-add operation operates on: the intermediate M-bit representation, a quantization scale factor value indicated by the instruction, and a zero-point value indicated by the instruction. In some embodiments that support down-conversion, the floating-point pipeline circuitry is also configured to execute a single instruction to convert an M-bit floating-point value to an N-bit integer result value.

20 Claims, 9 Drawing Sheets

HARDWARE SUPPORT FOR CONVERSION BETWEEN INTEGER AND FLOATING-POINT DATA

BACKGROUND

Technical Field

This disclosure relates generally to computer processors and more particularly to floating-point operations and quantization.

Description of Related Art

Various computer programs that use floating-point values may also implement quantization, conversion to other data types, or both. For example, tensor data for machine learning applications is often quantized and stored as integer values (e.g., int8 which is an 8-bit integer format). This data may need to be up-converted to floating-point (e.g., F32) for various operations (e.g., matrix add, MXU multiply, etc.) and floating-point data may also need to be down-converted. Traditionally, these conversion operations may use multiple instructions, which may reduce throughput and may affect the ability to provide inputs to consuming circuitry (e.g., matrix multiply acceleration hardware).

DETAILED DESCRIPTION

In disclosed embodiments, datapath circuitry (e.g., of a shader core of a graphics processor) includes up-conversion circuitry for one or more input operand paths, down-conversion circuitry for a result operand path, or both. For example, a floating-point fused multiple add (FMA) pipeline may include up-conversion circuitry configured to convert from int8 to F32 and down-conversion circuitry configured to convert from F32 to int8. (These formats are included for purposes of explanation, but various other input and output formats may be supported.) This may advantageously allow the processor to support single-instruction quantization and de-quantization operations, which may improve throughput, e.g., to generate inputs for matrix multiply accelerator hardware. This may improve performance for various workloads, including machine learning or artificial intelligence applications, for example.

Further, in some embodiments, a matrix multiply accelerator includes up-conversion circuitry configured to convert integer results from the accelerator to floating-point results before writing results back to the register file. This may advantageously improve performance when consumer workloads utilize a different format than natively generated by the accelerator hardware.

Graphics Processing Overview

Figure 1A:
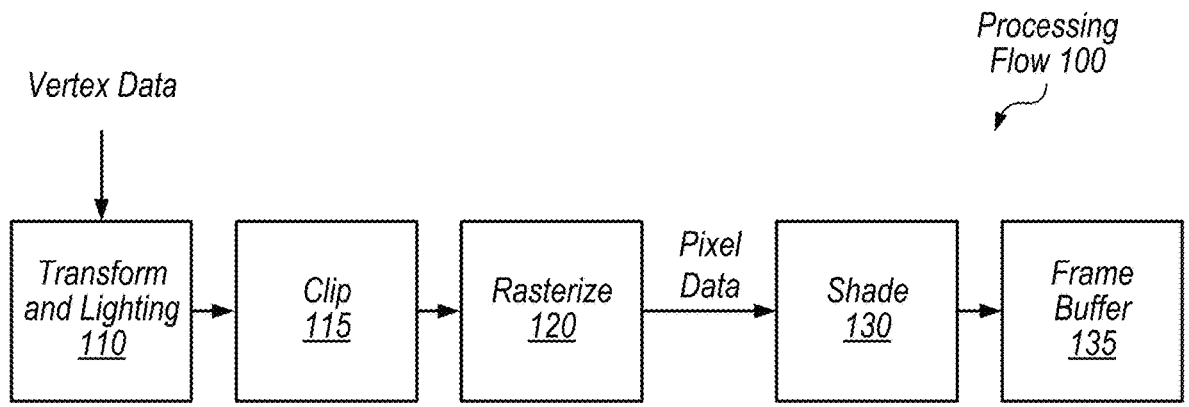
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
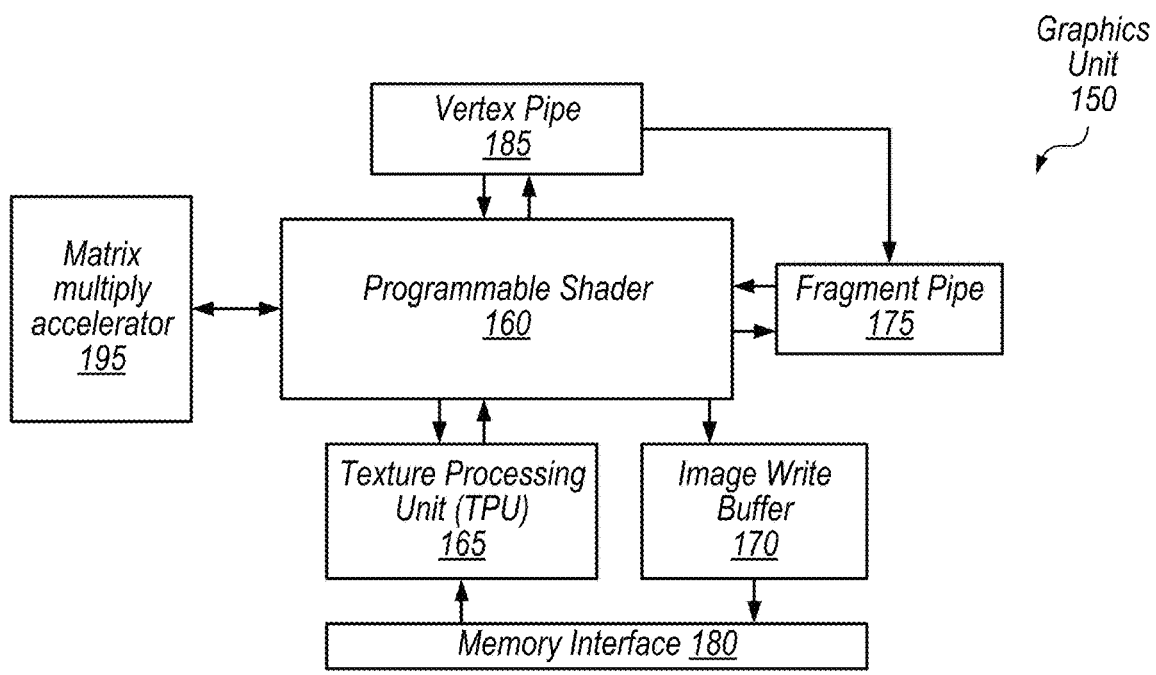
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread) groups, single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger threadgroup of threads that execute the same program, which may be broken up into a number of SIMD groups (within which threads may execute in lockstep) based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU.

In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

In the illustrated example, graphics unit 150 includes matrix multiply accelerator 195, which may include hardware configured to perform various matrix multiply operations in response to instruction(s) executed by programmable shader 160, as described in detail below. In some embodiments, matrix multiply accelerator 195 is configured to access register data in a register file (or any appropriate storage circuitry) that is also accessible to programmable shader 160. Programmable shader 160 may execute various instructions using its execution pipelines to generate data for consumption by matrix multiply accelerator 195 and may similarly access results generated by accelerator 195 via the register file.

Note that GPU embodiments with matrix multiply acceleration hardware are included herein for purposes of explanation, but disclosed techniques may be used in various other embodiments, including central processing units, machine learning accelerator hardware, etc. in which floating-point pipelines are configured to generate input data for, or receive output data from, other arithmetic circuitry that uses a different format.

Overview of Conversion Circuitry in Pipeline

Figure 2:
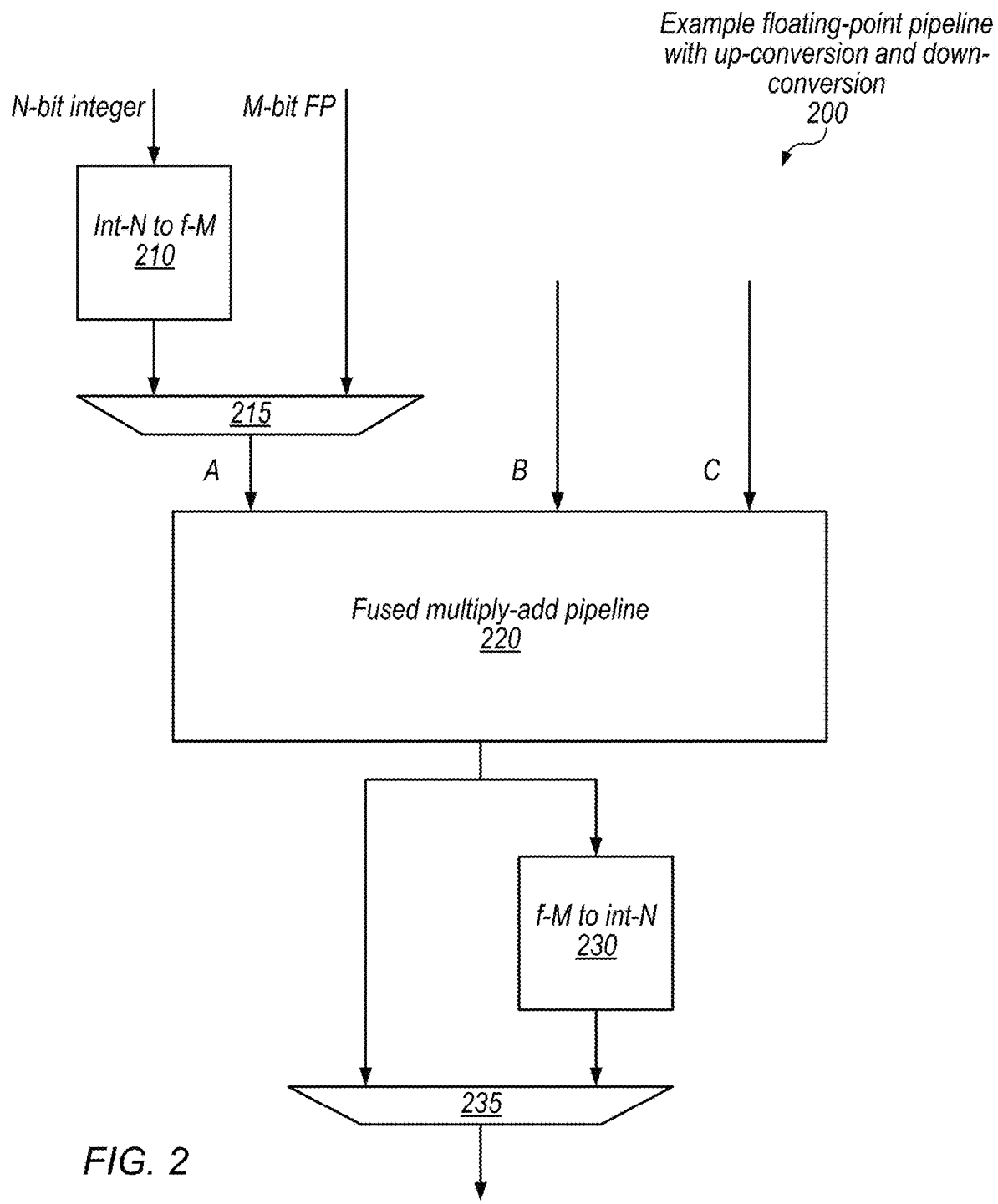
FIG. 2 is a block diagram illustrating an example floating-point pipeline with integer up-conversion and down-conversion, according to some embodiments.

FIG. 2 is a block diagram illustrating an example floating-point pipeline with integer up-conversion and down-conversion, according to some embodiments. Quantization of floating-point data may be advantageous in various scenarios, e.g., for tensor data such as activations or learned parameters. Quantization in this context may both accelerate arithmetic (e.g., using hardware specialized to operate on quantized values at a high rate) and reduce memory footprint and bandwidth of data movement operations.

Matrix multiply accelerator circuitry 195, for example, may perform int8 matrix multiplication with high throughput and may pack int8 values into sub-fields, e.g., of a 32-bit or 64-bit general-purpose register. Floating-point units of shader 160, however, may not be configured to natively operate on int8 values and therefore may traditionally need to execute instructions for bit field extraction, conversion to floating-point, and affine transformation for each element of a given matrix.

Note that conversion and multiplications may occur in the context of residual layers of neural networks that perform element-wise addition of input activation tensors prior to multiplication, e.g., according to the equation below:

$$C=C+(A_0+A_1)\times B=[(\text{float}(A_0)-z_0)\cdot s_0+(\text{float}(A_1)-z_1)\cdot s_1]\times B \quad (1)$$

More generally, various operations may be performed on floating-point data (e.g., non-linear activation function, dropout, add residual activation layers, etc.) while other operations may be performed on quantized (e.g., int8) data. This potentially results in numerous quantization and de-quantization operations, e.g., between neural network layers. Similar considerations may apply to various other machine learning topologies. In various contexts, the matrix accelerator work may amortize the cost of de-quantization operations, but this may not be the case for certain applications (e.g., small layers), real-time networks, etc. where the execution pipelines performing the conversions (e.g., in shader 160) may potentially starve the accelerator hardware (e.g., accelerator 195). Various techniques discussed below may address this issue by providing conversion circuitry for source operands, a destination operand, or both of a floating-point pipeline, which may provide support for quantization and de-quantization using a single instruction.

Note that quantized data may be packed, e.g., with multiple values stored using the same storage size as a single value of another precision. For example, four int8 values may be stored using the same number of bytes as a 32-bit floating-point value. Rather than being accessed using separate read/write operations to different addresses, a single read/write to a packed set of values may be performed (with other operations being used to access individual packed values in the set). Therefore, various quantized values discussed herein may be stored as packed tiles of a matrix being operated on (e.g., by a matrix multiply accelerator).

The following equation is one example of a technique to up-convert an integer to a floating-point value, where q is a quantized n-bit integer value, f is a floating-point value, s is a scale factor, and z is a zero-point (also referred to as a bias).

$$f = \text{float}(q)*\left(\frac{1}{s}\right)-\left(\frac{z}{s}\right) \quad (2)$$

Similarly, equation 3 below is an example of a technique to down-convert a floating-point value to an integer value:

$$q=\text{round}(\min(\max(f\cdot s+z,0.0),2^n-1)) \quad (3)$$

where the round function converts its argument to the nearest integer value using a configurable rounding mode (e.g., configurable to round towards zero (RTZ), round towards nearest ties-to-infinity (RTN), or round towards nearest ties-to-even (RTNE)). Generally, these operations may clamp to the representable range of an N-bit integer output value. In the illustrated example, a floating-point pipeline 200 supports up-conversion and down-conversion and includes int-N to f-M circuitry 210, multiplexers (MUXes) 215 and 235, fused multiply-add pipeline 220, and f-M to int-N circuitry 230.

The int-N to f-M circuitry 210, in some embodiments, is configured to convert an N-bit integer to an M-bit floating point value. This may implement the float(q) portion of equation 2, for example. This may provide hardware support for up-conversion, e.g., based on a single executed instruction. Circuitry 210 may be implemented using various specific circuits in different embodiments. As one example, circuitry 210 may include a leading zero detector configured to find the most significant bit that is a logical 1 in the input integer value, shift circuitry configured to shift the input to form the floating-point mantissa, exponent circuitry configured to set the floating-point exponent based on the amount of the shift.

Multiplexer 215, in some embodiments, is configured to select between the output of circuitry 210 and a traditional M-bit floating-point source operand based on a select signal (not explicitly shown).

FMA pipeline 220, in the illustrated embodiment, is configured to perform fused multiply-add operations on inputs A, B, and C. The processor may support fused multiply-add instructions that indicate the A, B, and C input operands (e.g., by specifying floating-point registers using input operand fields). In some embodiments, an existing instruction is augmented to include a bit or otherwise encode whether circuitry 210 is to be utilized to up-convert an integer value and, in that case, the instruction may indicate a register that stores an integer value (potentially packed with other integer values). In some embodiments, int-N to f-M conversion circuitry (not explicitly shown) similar to circuitry 210 is included for multiple inputs to pipeline 220. Example mappings of the inputs A, B, and C to operands of equations 2 are 3 are discussed in further detail below with reference to FIGS. 3 and 4.

FMA pipeline 220 may include multiple stages configured to perform various operations over multiple clock cycles, such as arithmetic operations on the mantissas of the inputs, operations on the exponents, round operations, etc. to properly implement an FMA operation. Note that some embodiments may include circuitry 210 and not circuitry 230 or vice versa (if only up-conversion or only down-conversion is supported in hardware).

The f-M to int-N circuitry 230, in some embodiments, is configured to convert an M-bit floating-point output generated by FMA pipeline 220 to an N-bit integer value. This may provide hardware support for down-conversion, e.g., based on a single executed instruction. A given fused multiply-add instruction may be augmented to include a bit or otherwise encode whether circuitry 230 is to be utilized to down-convert a floating-point value indicated as the A input operand.

Circuitry 230 may be implemented using various specific circuits in different embodiments. As one example, circuitry 230 may include shift circuitry configured to shift the floating-point mantissa (including an implied most-significant bit) to generate an integer result based on the exponent value and circuitry configured to implement the round operation of equation 3 and the min/max operations of equation 3 (e.g., using comparator circuits). In some embodiments that support signed values, circuitry 210 may be configured to generate a floating-point sign bit and circuitry 230 may be configured to perform arithmetic to generate signed integer values based on a floating-point sign bit.

Multiplexer 235, in some embodiments, is configured to select between a traditional floating-point output of FMA pipeline 220 and the output of circuitry 230.

Up-Conversion and Down-Conversion Example and Example Instruction Formats

Figure 3:
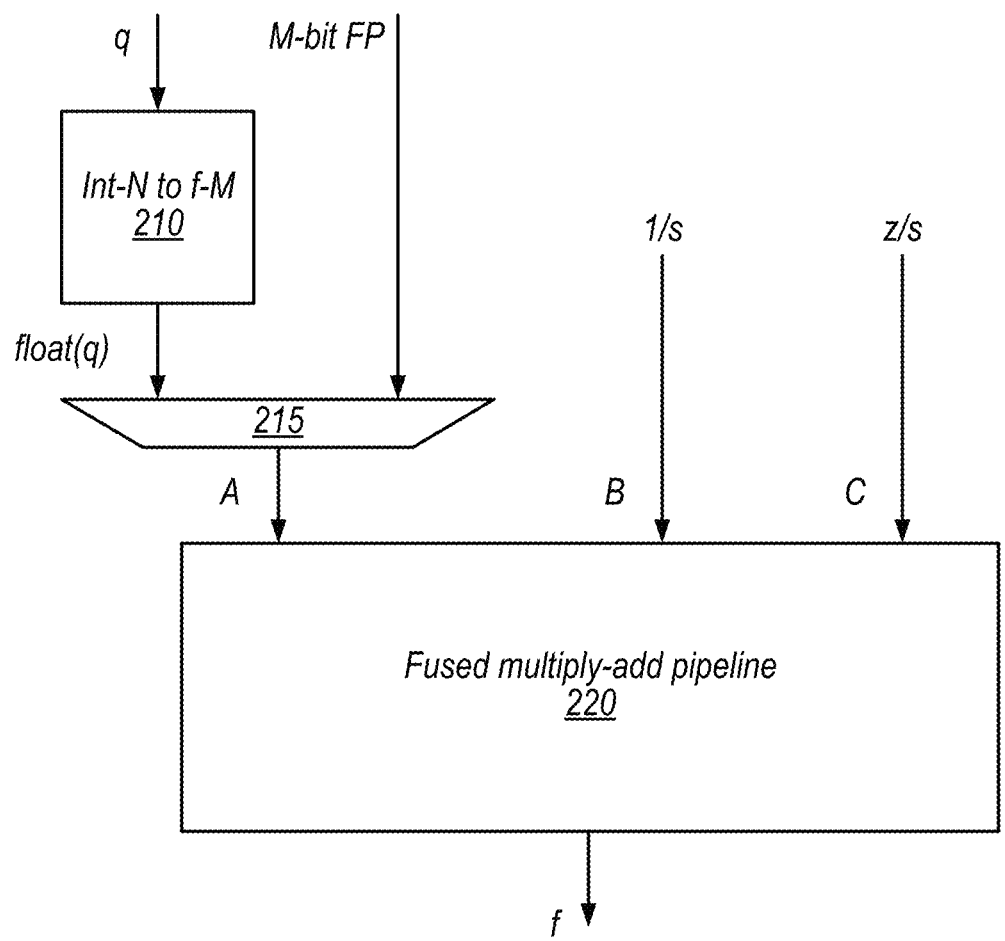
FIG. 3 is a block diagram illustrating example up-conversion, according to some embodiments.

FIG. 3 is a block diagram illustrating example up-conversion, according to some embodiments. The values in this example correspond to equation 2 discussed above. In this example up-conversion 300, the integer value to be up-converted (q) is input to conversion circuitry 210 and MUX 215 selects the output from circuitry 210. Note that q may be packed in a register with one or more other integer values, in some embodiments. 1/s is provided as the B input operand (e.g., the instruction indicates a floating-point register that currently stores the 1/s value) and z/s is provided as the C input operand (e.g., the instruction indicates a floating-point register that currently stores the z/s value). Circuitry 220 then provides the floating-point result f.

Figure 4:
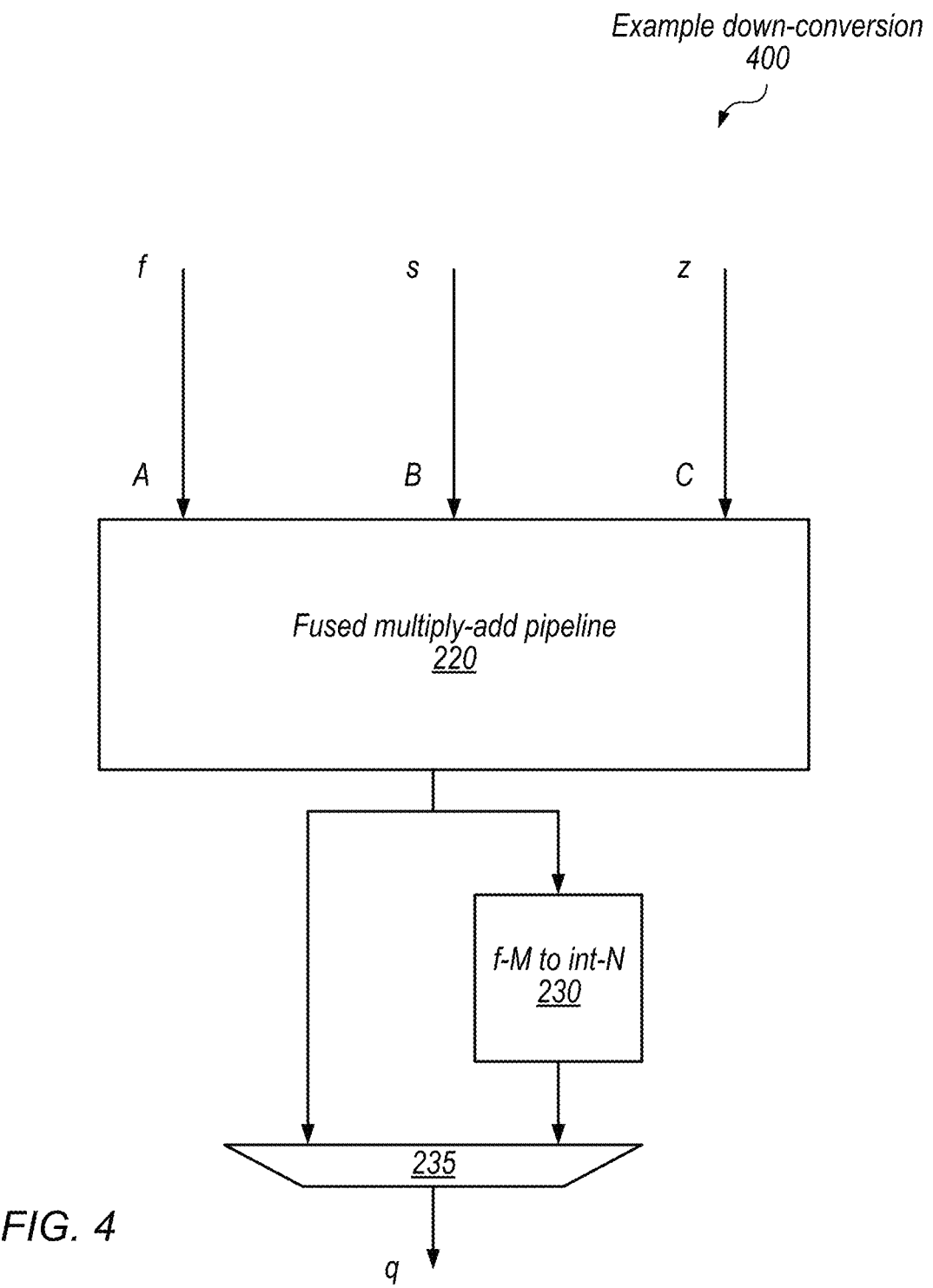
FIG. 4 is a block diagram illustrating example down-conversion, according to some embodiments.

FIG. 4 is a block diagram illustrating example down-conversion, according to some embodiments. The values in this example correspond to equation 3, discussed above. In this example down-conversion 400, the floating-point value to be down-converted (f) is input as operand A, the scale factor s is input as operand B, and the zero point z is input as operand C. These input values may be stored in floating-point registers, for example. Circuitry 230 then converts the result to an integer value, which MUX 235 selects as the output q.

Note that a given embodiment may include circuitry 210 but not circuitry 230 or vice versa. Thus, some embodiments may implement up-conversion but not down-conversion and some embodiments may implement down-conversion but not up-conversion.

In various embodiments, the disclosed up-conversion and down-conversion techniques may be implemented using an existing fused multiply-add instruction with an encoding that allows specification of one or more operands as integer data types, the output as an integer data type, or both (e.g., to invoke operations by circuitry 210/230). Various other inputs values may be provided as floating-point values supported by the existing fused multiply-add instruction (e.g., f, s, z, 1/s, z/s, etc.)

Example Conversion of Accelerator Results

Figure 5:
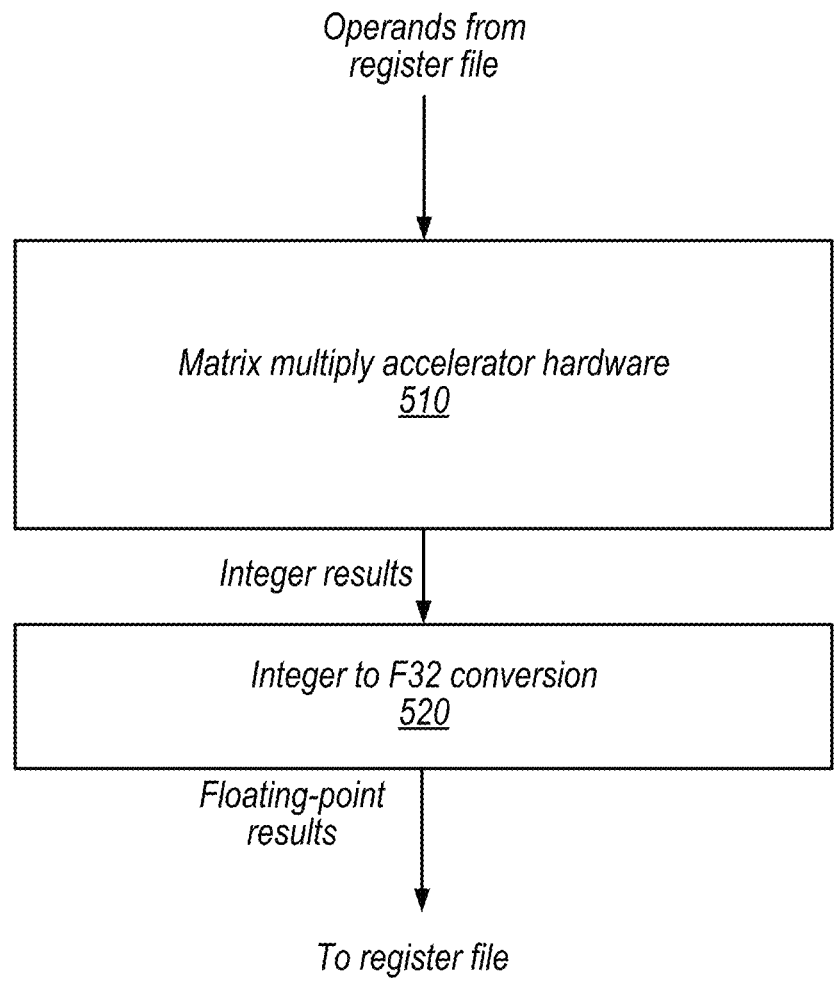
FIG. 5 is a diagram illustrating example integer to floating-point conversion for outputs of matrix multiply accelerator hardware prior to writing results back to a register file, according to some embodiments.

FIG. 5 is a diagram illustrating example integer to floating-point conversion for outputs of matrix multiply accelerator hardware prior to writing results back to a register file, according to some embodiments. In the illustrated embodiment, matrix multiply accelerator hardware 510 is configured to retrieve operands from a register file, perform various operations on those operands, and write results back to the register file. Accelerator 510 includes various circuitry such as adders, multipliers, transposers, etc. to perform matrix multiplications on input matrices of one or more sizes. The register file may store data for registers such as general purpose registers (GPRs) or other types of registers that are visible to hardware 510 and other programs. An executing program (e.g., a shader program executing on programmable shader 160) may execute one or more instructions that invoke matrix acceleration hardware 510 and those instructions may specify sets of registers that store input operands, result operands, or both.

Matrix multiply accelerator 510 may operate on inputs and outputs having the same format, e.g., an 8-bit integer format such as int8. Various other operations (e.g., performed by the shader core requesting the matrix multiply acceleration) may occur in another format, however, e.g., a 32-bit floating-point format.

Therefore, in the disclosed embodiments, integer to F32 conversion circuitry 520 is configured to receive integer results from the accelerator hardware 510 and generate floating-point results prior to storage in the register file. In some embodiments, an opcode or field of a matrix multiplication instruction indicates whether up-conversion is to be performed after the matrix multiplication.

Similar techniques may be used for other accelerator functions instead of or in place of matrix multiplication and other up-conversion output formats may be implemented (e.g., F16, F64, etc.). In various embodiments, including up-conversion hardware with the accelerator hardware may advantageously improve performance when consumer workloads utilize a different format than supported by accelerator hardware 510, e.g., by avoiding a need to execute an up-conversion instruction after the accelerated operation is complete.

Example Method

Figure 6:
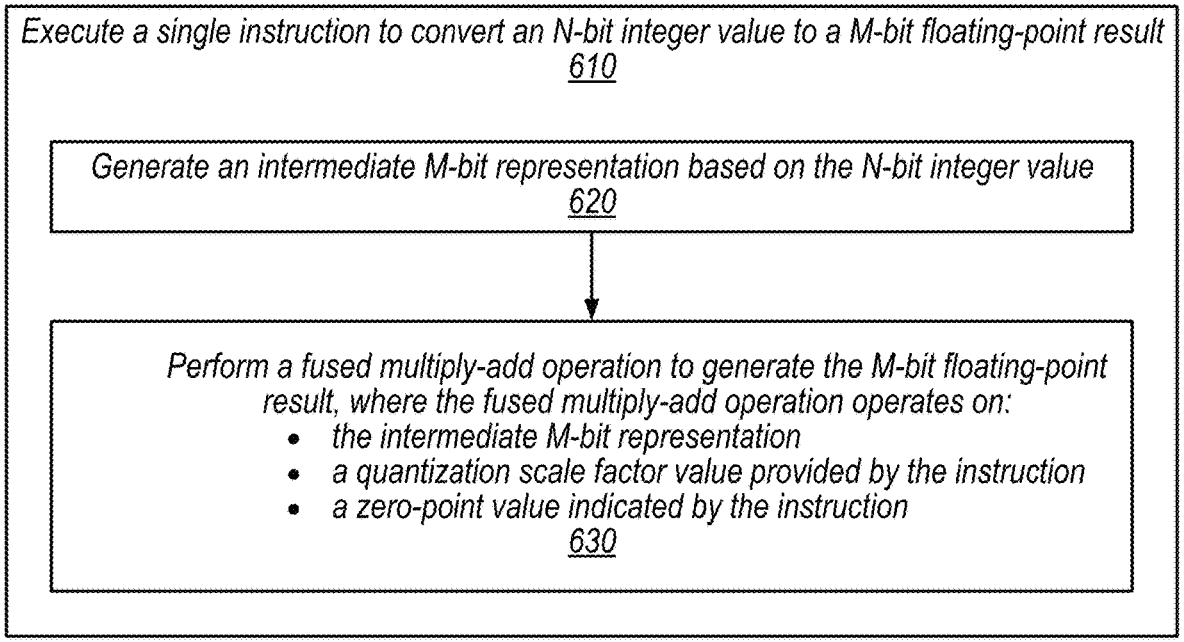
FIG. 6 is a flow diagram illustrating an example method, according to some embodiments.

FIG. 6 is a flow diagram illustrating an example method for up-conversion from an N-bit integer to an M-bit floating-point value according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, a computing device (e.g., an execution pipeline 200 in programmable shader 160) executes a single instruction to convert an N-bit integer value to an M-bit floating-point result. In some embodiments, M is an integer multiple of N. In the illustrated example, this includes elements 620 and 630. In some embodiments, the N-bit integer value is included in a packed matrix tile being summed prior to a multiplication by matrix multiply acceleration hardware.

At 620, in the illustrated embodiment, the computing device (e.g., circuitry 210) generates an intermediate M-bit representation based on the N-bit integer value.

At 630, in the illustrated embodiment, the computing device (e.g., circuitry 220) performs a fused multiply-add operation to generate the M-bit floating-point result, where the fused multiply-add operation operates on: the intermediate M-bit representation, a quantization scale factor value indicated by the instruction, and a zero-point value indicated by the instruction (e.g., by specifying floating-point registers that store the quantization scale factor and the zero-point value as a source operands).

In some embodiments, the quantization scale factor and the zero-point value are M-bit representations. In some embodiments, N is eight and M is thirty-two, although various other operand sizes and various encodings are contemplated.

In some embodiments, the device uses source modifier circuitry and fused multiply-add circuitry to execute a single instruction to convert two N/2-bit integer values to Q-bit floating-point values (e.g., by performing two FMA operations; other inputs such as s and z may be re-used for the two operations). In some embodiments, Q is an integer multiple of N/2. In some embodiments, Q=M. For example, this instruction may take two int4 values and generate two floating-point outputs.

In some embodiments, the device is configured to perform down-conversion operations. For example, floating-point pipeline circuitry may include destination modifier circuitry. The device may execute a single instruction to convert an input M-bit floating-point input value to an N-bit integer result value. Execution of the instruction may include performing a fused multiply-add operation using the fused multiply-add circuitry to generate an M-bit floating-point intermediate value, where the fused multiply-add operation operates on: the input M-bit floating-point value, a reciprocal of a quantization scale factor, and a quotient of a zero-point value and the quantization scale factor (the quotient and reciprocal may be input operands to the instruction).

In some embodiments, the destination modifier circuitry may determine a max value among the M-bit floating-point intermediate value and zero, determine a min value among the max value and 2N−1, and round the min value (thereby clamping the result to the representable range of the N-bit integer).

In some embodiments, the device includes matrix multiply acceleration hardware that is configured to: read input registers that include matrix data, perform matrix multiplication to generate integer matrix entry results, convert the integer matrix entry results to floating-point representations prior to writing the matrix entry results to destination registers, and store the floating-point representations in destination registers as matrix multiplication result data. This hardware support for conversion at the back end of the acceleration hardware prior to writing results to the register file may provide various advantages over executing processor instructions to perform the conversion.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

Multiple "kicks" may be executed to render a frame of graphics data. In some embodiments, a kick is a unit of work from a single context that may include multiple threads to be executed (and may potentially include other types of graphics work that is not performed by a shader). A kick may not provide any assurances regarding memory synchronization among threads (other than specified by the threads themselves), concurrency among threads, or launch order among threads. In some embodiments, a kick may be identified as dependent on the results of another kick, which may allow memory synchronization without requiring hardware memory coherency support. Typically, graphics firmware or hardware programs configuration registers for each kick before sending the work to the pipeline for processing. Often, once a kick has started, it does not access a memory hierarchy past a certain level until the kick is finished (at which point results may be written to another level in the hierarchy). Information for a given kick may include state information, location of shader program(s) to execute, buffer information, location of texture data, available address spaces, etc. that are needed to complete the corresponding graphics operations. Graphics firmware or hardware may schedule kicks and detect an interrupt when a kick is complete, for example. In some embodiments, portions of a graphics unit are configured to work on a single kick at a time. This set of resources may be referred to as a "kickslot." Thus, in some embodiments, any data that is needed for a given kick is read from memory that is shared among multiple processing elements at the beginning of the kick and results are written back to shared memory at the end of the kick. Therefore, other hardware may not see the results of the kick until completion of the kick, at which point the results are available in shared memory and can be accessed by other kicks (including kicks from other data masters). A kick may include a set of one or more rendering commands, which may include a command to draw procedural geometry, a command to set a shadow sampling method, a command to draw meshes, a command to retrieve a texture, a command to perform generation computation, etc. A kick may be executed at one of various stages during the rendering of a frame. Examples of rendering stages include, without limitation: camera rendering, light rendering, projection, texturing, fragment shading, etc. Kicks may be scheduled for compute work, vertex work, or pixel work, for example.

In some embodiments, a graphics driver maps a new kick to one of multiple kickslots. Each kickslot may include a set of configuration registers and may have a context ID that indicates a mapping between the kick's virtual addresses and physical addresses. In some embodiments, the graphics driver starts a persistent mapping thread for each kickslot via a configuration register, and starts the persistent mapping thread prior to starting the kick via a configuration register. In some embodiments, a mapping thread may persist across multiple kicks in a kickslot, e.g., if the kicks have the same context ID.

Example Device

Figure 7:
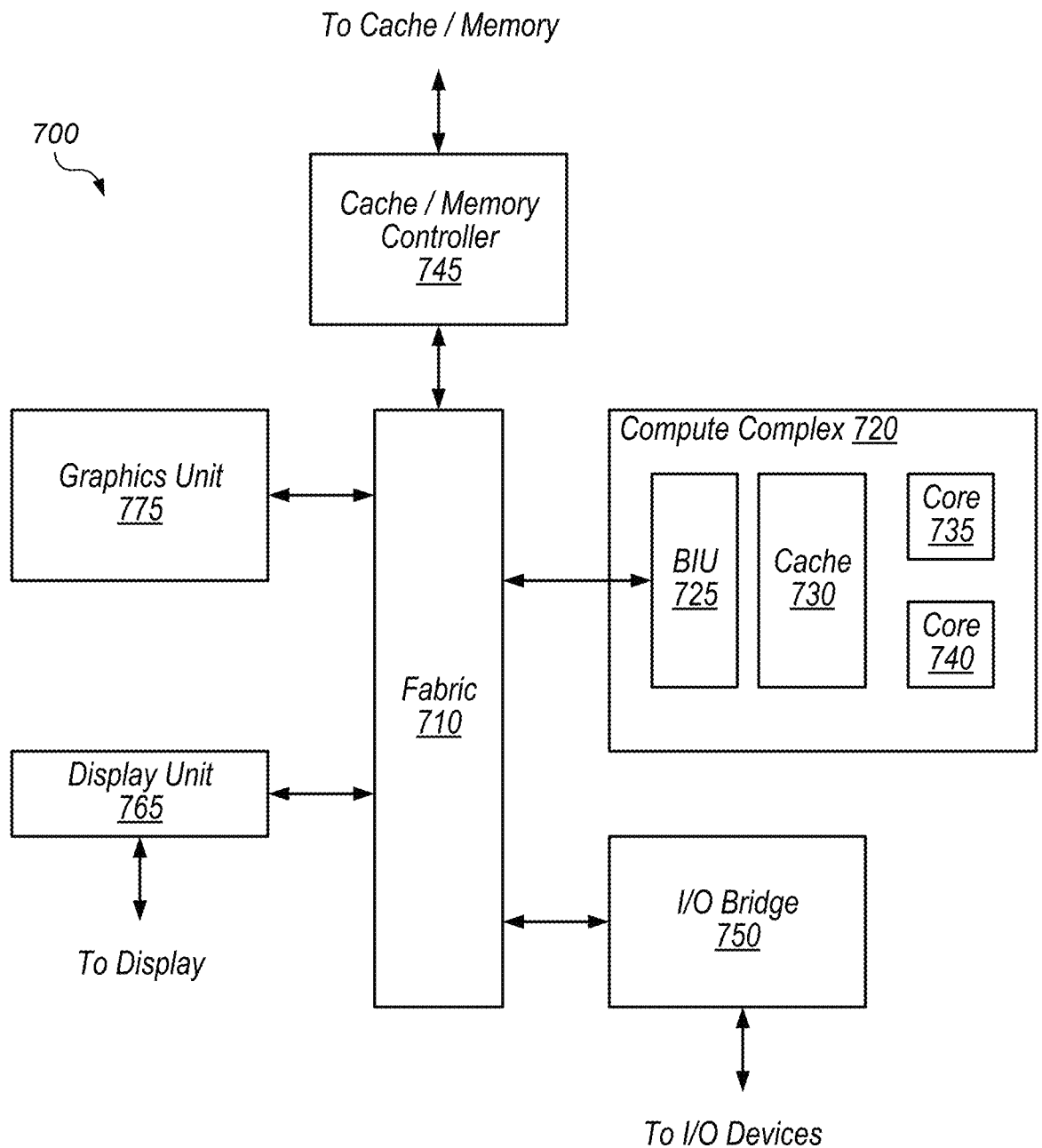
FIG. 7 is a block diagram illustrating an example computing device, according to some embodiments.

Referring now to FIG. 7, a block diagram illustrating an example embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 775, and display unit 765. In some embodiments, device 700 may include other components (not shown) in addition to or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and caches. For example, compute complex 720 may include 1, 2, or 4 processor cores, or any other suitable number. In one embodiment, cache 730 is a set associative L2 cache. In some embodiments, cores 735 and 740 may include internal instruction and data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions. These instructions may be stored in computer readable medium such as a memory coupled to memory controller 745 discussed below.

As used herein, the term "coupled to" may indicate one or more connections between elements, and a coupling may include intervening elements. For example, in FIG. 7, graphics unit 775 may be described as "coupled to" a memory through fabric 710 and cache/memory controller 745. In contrast, in the illustrated embodiment of FIG. 7, graphics unit 775 is "directly coupled" to fabric 710 because there are no intervening elements.

Cache/memory controller 745 may be configured to manage transfer of data between fabric 710 and one or more caches and memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches. Memory coupled to controller 745 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 745 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 720 to cause the computing device to perform functionality described herein.

Graphics unit 775 may include one or more processors, e.g., one or more graphics processing units (GPUs). Graphics unit 775 may receive graphics-oriented instructions, such as OPENGL®, Metal®, or DIRECT3D® instructions, for example. Graphics unit 775 may execute specialized GPU instructions or perform other operations based on the received graphics-oriented instructions. Graphics unit 775 may generally be configured to process large blocks of data in parallel and may build images in a frame buffer for output to a display, which may be included in the device or may be a separate device. Graphics unit 775 may include transform, lighting, triangle, and rendering engines in one or more graphics processing pipelines. Graphics unit 775 may output pixel information for display images. Graphics unit 775, in various embodiments, may include programmable shader circuitry which may include highly parallel execution cores configured to execute graphics programs, which may include pixel tasks, vertex tasks, and compute tasks (which may or may not be graphics-related).

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and low-power always-on functionality, for example. I/O bridge 750 may also include interfaces such as pulse-width modulation (PWM), general-purpose input/output (GPIO), serial peripheral interface (SPI), and inter-integrated circuit (I2C), for example. Various types of peripherals and devices may be coupled to device 700 via I/O bridge 750.

In some embodiments, device 700 includes network interface circuitry (not explicitly shown), which may be connected to fabric 710 or I/O bridge 750. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 700 with connectivity to various types of other devices and networks.

Example Applications

Figure 8:
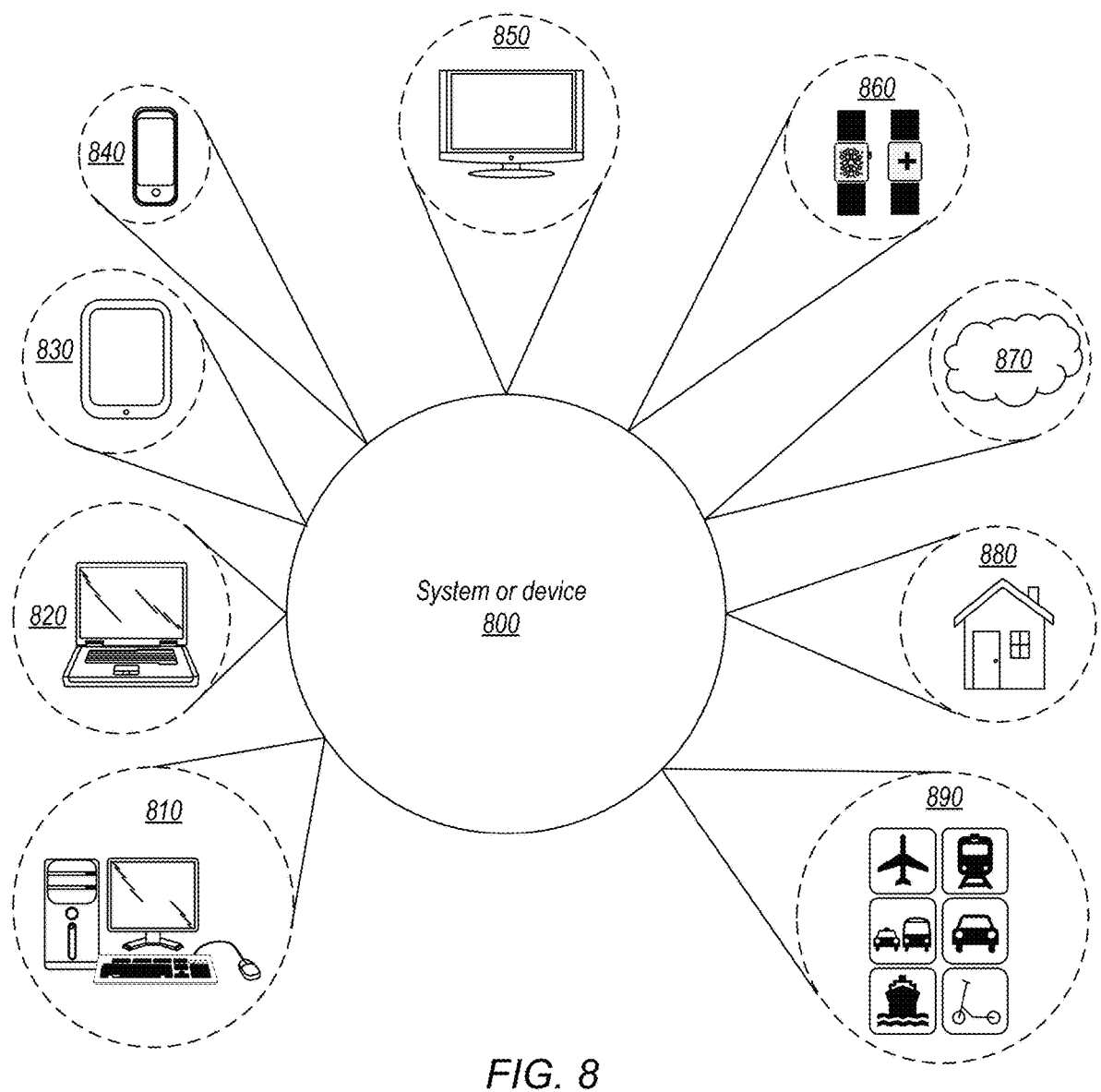
FIG. 8 is a diagram illustrating example applications of disclosed systems and devices, according to some embodiments.

Turning now to FIG. 8, various types of systems that may include any of the circuits, devices, or system discussed above. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 9:
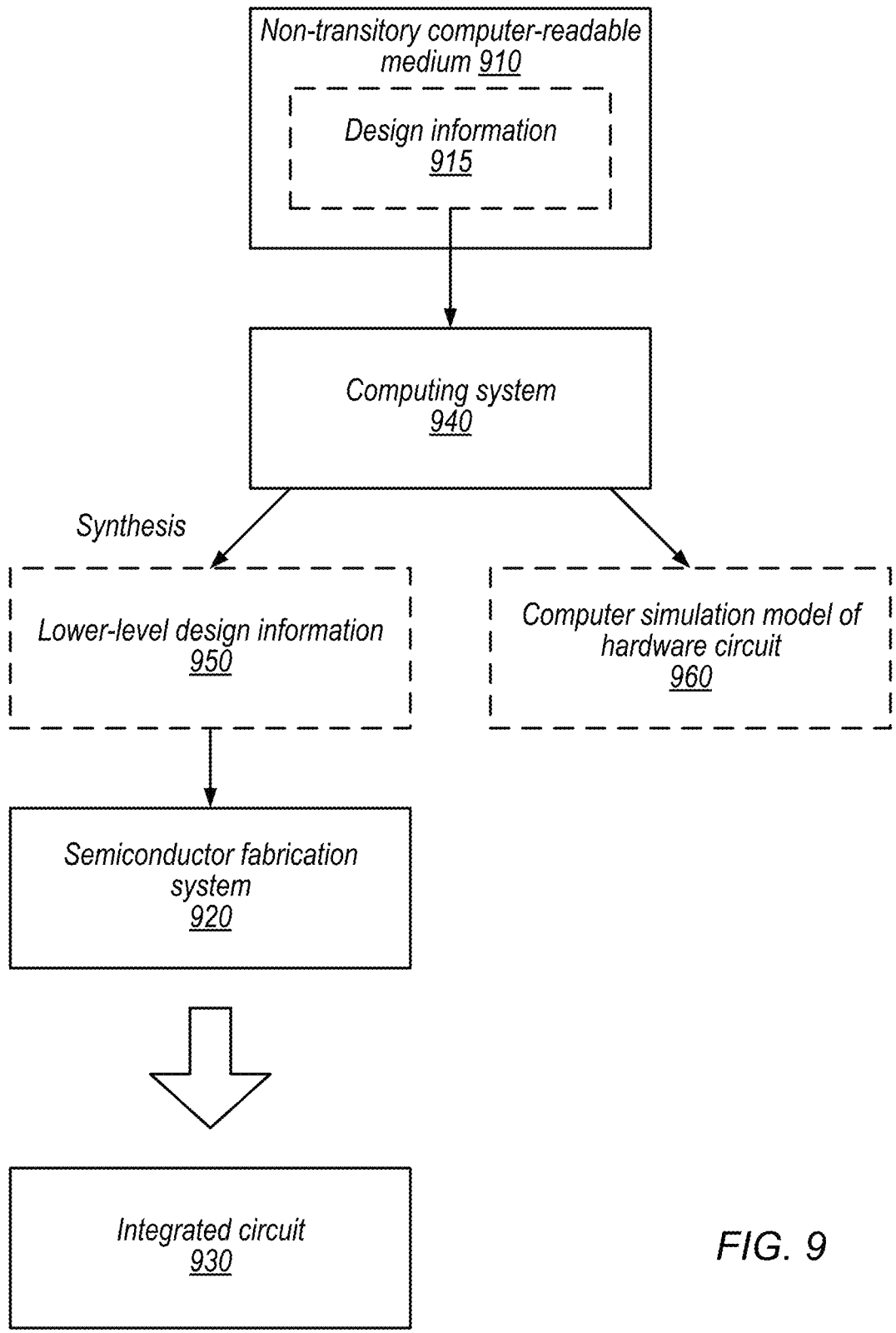
FIG. 9 is a block diagram illustrating an example computer-readable medium that stores circuit design information, according to some embodiments.

FIG. 9 is a block diagram illustrating an example non-transitory computer-readable storage medium that stores circuit design information, according to some embodiments. In the illustrated embodiment, computing system 940 is configured to process the design information. This may include executing instructions included in the design information, interpreting instructions included in the design information, compiling, transforming, or otherwise updating the design information, etc. Therefore, the design information controls computing system 940 (e.g., by programming computing system 940) to perform various operations discussed below, in some embodiments.

In the illustrated example, computing system 940 processes the design information to generate both a computer simulation model of a hardware circuit 960 and lower-level design information 950. In other embodiments, computing system 940 may generate only one of these outputs, may generate other outputs based on the design information, or both. Regarding the computing simulation, computing system 940 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 940 also processes the design information to generate lower-level design information 950 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 950 (potentially among other inputs), semiconductor fabrication system 920 is configured to fabricate an integrated circuit 930 (which may correspond to functionality of the simulation model 960). Note that computing system 940 may generate different simulation models based on design information at various levels of description, including information 950, 915, and so on. The data representing design information 950 and model 960 may be stored on medium 910 or on one or more other media.

In some embodiments, the lower-level design information 950 controls (e.g., programs) the semiconductor fabrication system 920 to fabricate the integrated circuit 930. Thus, when processed by the fabrication system, the design information may program the fabrication system to fabricate a circuit that includes various circuitry disclosed herein.

Non-transitory computer-readable storage medium 910 may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Accordingly, non-transitory computer-readable storage medium 910 may include two or more memory media; such media may reside in different locations—for example, in different computer systems that are connected over a network.

Design information 915 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 940, semiconductor fabrication system 920, or both. In some embodiments, design information may also include one or more cell libraries that specify the synthesis, layout, or both of integrated circuit 930. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 930 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 and model 960 are configured to operate according to a circuit design specified by design information 915, which may include performing any of the functionality described herein. For example, integrated circuit 930 may include any of various elements shown in FIGS. 1B, 2-4, 6, and 8. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . ." does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 920 to fabricate integrated circuit 930.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:
   floating-point pipeline circuitry configured to execute a single instruction to convert an N-bit integer value to an M-bit floating-point result, the floating-point pipeline circuitry comprising:
   source modifier circuitry configured to generate an intermediate M-bit representation based on the N-bit integer value; and
   fused multiply-add circuitry configured to perform a fused multiply-add operation to generate the M-bit floating-point result, wherein the fused multiply-add operation operates on:
   the intermediate M-bit representation;
   a quantization scale factor value indicated by the instruction; and
   a zero-point value indicated by the instruction.

2. The apparatus of claim 1, wherein the quantization scale factor and the zero-point value are M-bit floating-point representations.

3. The apparatus of claim 1, wherein N is eight and M is thirty-two.

4. The apparatus of claim 1, wherein the N-bit integer value is included in a packed matrix tile being summed prior to a multiplication by matrix multiply acceleration hardware.

5. The apparatus of claim 1, wherein the floating-point pipeline circuitry is further configured to use the source modifier circuitry and fused multiply-add circuitry to execute a single instruction to convert two N/2-bit integer values to Q-bit floating-point results.

6. The apparatus of claim 1, wherein:
   the floating-point pipeline circuitry further includes destination modifier circuitry; and
   the floating-point pipeline circuitry is further configured to execute a single instruction to:
   perform a fused multiply-add operation using the fused multiply-add circuitry to generate an M-bit floating-point intermediate value, wherein the fused multiply-add operation operates on:
   an input M-bit floating-point value;
   a reciprocal of a quantization scale factor, wherein the reciprocal is indicated by the instruction; and
   a quotient of a zero-point value and the quantization scale factor, wherein the quotient is indicated by the instruction; and
   modify the M-bit floating-point intermediate value using the destination modifier circuitry to generate an N-bit integer value.

7. The apparatus of claim 6, wherein the destination modifier circuitry is configured to clamp the intermediate value to a representable range of the N-bit integer value.

8. The apparatus of claim 1, further comprising:
   matrix multiply acceleration hardware configured to:
   read input registers that include matrix data;

perform matrix multiplication to generate integer matrix entry results;
convert the integer matrix entry results to floating-point representations prior to writing the matrix entry results to destination registers; and
store the floating-point representations in destination registers as matrix multiplication result data.

9. The apparatus of claim 1, wherein the apparatus is a computing device that further includes:
a central processing unit;
a display; and
network interface circuitry.

10. The apparatus of claim 1, wherein:
the N-bit integer value is packed with one or more other N-bit integer values in a storage circuit configured to store M bits; and
load circuitry of the apparatus is configured to access both the N-bit integer value and the one or more other N-bit integer values in a single load operation.

11. The apparatus of claim 1, wherein the apparatus includes:
a plurality of single-instruction multiple-data pipelines configured to execute instructions; and
fixed-function circuitry configured to control the single-instruction multiple-data pipelines to perform operations for at least one of the following types of programs:
graphics shader programs; and
machine learning programs.

12. A method, comprising:
executing, by a computing system, a single instruction to convert an N-bit integer value to an M-bit floating-point value, wherein the executing includes:
generating an intermediate M-bit representation based on the N-bit integer value; and
performing a fused multiply-add operation to generate the M-bit floating-point value, wherein the fused multiply-add operation operates on:
the intermediate M-bit representation;
a quantization scale factor value indicated by the instruction; and
a zero-point value indicated by the instruction.

13. The method of claim 12, wherein the quantization scale factor and the zero-point value are M-bit representations.

14. The method of claim 12, wherein the N-bit integer value is included in a packed matrix tile being summed prior to a multiplication by matrix multiply acceleration hardware.

15. The method of claim 12, further comprising:
executing, by the computing system, a single instruction to:
perform a fused multiply-add operation to generate an M-bit floating-point intermediate value, wherein the fused multiply-add operation operates on:
an input M-bit floating-point value;
a reciprocal of a quantization scale factor, wherein the reciprocal is indicated by the instruction; and
a quotient of a zero-point value and the quantization scale factor, wherein the quotient is indicated by the instruction; and
modify the M-bit floating-point intermediate value to generate an N-bit integer value.

16. The method of claim 15, wherein the modifying includes clamping the intermediate value to a representable range of the N-bit integer value.

17. The method of claim 12, further comprising:
reading, by matrix multiply acceleration circuitry, input registers that include matrix data;
performing, by the matrix multiply acceleration circuitry, matrix multiplication to generate integer matrix entry results;
converting the integer matrix entry results to floating-point representations prior to writing the matrix entry results to destination registers; and
storing the floating-point representations in destination registers as matrix multiplication result data.

18. A non-transitory computer-readable medium having instructions of a hardware description programming language stored thereon that, when processed by a computing system, program the computing system to generate a computer simulation model, wherein the model represents a hardware circuit that includes:
floating-point pipeline circuitry configured to execute a single instruction to convert an N-bit integer value to an M-bit floating-point value, the floating-point pipeline circuitry comprising:
source modifier circuitry configured to generate an intermediate M-bit representation based on the N-bit integer value; and
fused multiply-add circuitry configured to perform a fused multiply-add operation to generate the M-bit floating-point value, wherein the fused multiply-add operation operates on:
the intermediate M-bit representation;
a quantization scale factor value indicated by the instruction; and
a zero-point value indicated by the instruction.

19. The non-transitory computer-readable medium of claim 18, wherein:
the floating-point pipeline circuitry further includes destination modifier circuitry; and
the floating-point pipeline circuitry is further configured to execute a single instruction to:
perform a fused multiply-add operation using the fused multiply-add circuitry to generate an M-bit floating-point intermediate value, wherein the fused multiply-add operation operates on:
an input M-bit floating-point value;
a reciprocal of a quantization scale factor, wherein the reciprocal is indicated by the instruction; and
a quotient of a zero-point value and the quantization scale factor, wherein the quotient is indicated by the instruction; and
modify the M-bit floating-point intermediate value using the destination modifier circuitry to generate an N-bit integer value.

20. The non-transitory computer-readable medium of claim 18, the circuit further comprising:
matrix multiply acceleration hardware configured to:
read input registers that include matrix data;
perform matrix multiplication to generate integer matrix entry results;
convert the integer matrix entry results to floating-point representations prior to writing the matrix entry results to destination registers; and
store the floating-point representations in destination registers as matrix multiplication result data.

* * * * *